(12) United States Patent
Dhodapkar et al.

(10) Patent No.: US 7,904,930 B2
(45) Date of Patent: Mar. 8, 2011

(54) BROADCAST CONTENT DELIVERY SYSTEMS AND METHODS

(75) Inventors: Amit A. Dhodapkar, Sunnyvale, CA (US); Arvind K. Peechara, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 10/965,501

(22) Filed: Oct. 14, 2004

(65) Prior Publication Data

US 2006/0085829 A1 Apr. 20, 2006

(51) Int. Cl.
*H04N 7/173* (2011.01)
(52) U.S. Cl. ............................. 725/86; 725/112; 725/114
(58) Field of Classification Search ................... 725/87, 725/86, 112, 114
See application file for complete search history.

(56) References Cited

U.S. PATENT DOCUMENTS

| | | | |
|---|---|---|---|
| 6,184,878 B1 * | 2/2001 | Alonso et al. ................. | 725/109 |
| 6,211,901 B1 * | 4/2001 | Imajima et al. ................. | 725/93 |
| 2001/0032257 A1 * | 10/2001 | Wells et al. .................... | 709/223 |
| 2002/0016969 A1 * | 2/2002 | Kimble ........................... | 725/87 |
| 2002/0069419 A1 * | 6/2002 | Raverdy et al. ................. | 725/87 |
| 2002/0116706 A1 * | 8/2002 | Bahraini ......................... | 725/32 |
| 2003/0005453 A1 * | 1/2003 | Rodriguez et al. .............. | 725/87 |
| 2003/0093799 A1 * | 5/2003 | Kauffman et al. .............. | 725/86 |
| 2004/0031064 A1 * | 2/2004 | Lindstrom et al. ............. | 725/150 |
| 2005/0289618 A1 * | 12/2005 | Hardin ............................ | 725/95 |
| 2006/0085553 A1 * | 4/2006 | Rachwalski et al. ........... | 709/233 |
| 2007/0083899 A1 * | 4/2007 | Compton et al. ............... | 725/87 |
| 2007/0130595 A1 * | 6/2007 | McElhatten et al. ............ | 725/88 |
| 2007/0214482 A1 * | 9/2007 | Nguyen .......................... | 725/91 |
| 2008/0101460 A1 * | 5/2008 | Rodriguez ............... | 375/240.01 |

* cited by examiner

*Primary Examiner* — Andrew Y Koenig
*Assistant Examiner* — Ricky Chin
(74) *Attorney, Agent, or Firm* — Lee & Hayes, PLLC

(57) ABSTRACT

In an implementation of broadcast content delivery, content is broadcast to television-based client devices via a broadcast communication link. The content can be generated for display to include a user-selectable control to initiate a request for additional content that includes broadcast content and/or on-demand content. A content provider receives the request for the on-demand content from a client device via a two-way communication link, and broadcasts the on-demand content to the television-based client devices via a channel of the broadcast communication link. The content provider also communicates an identifier via the two-way communication link to the client device such that the client device can identify the channel of the broadcast communication link and receive the on-demand content via the broadcast communication link.

43 Claims, 5 Drawing Sheets

BROADCAST CONTENT DELIVERY SYSTEMS AND METHODS

TECHNICAL FIELD

This invention relates to broadcast content delivery systems and methods.

BACKGROUND

In an interactive television system, content delivery networks are typically based on a broadcast carousel only model that has limited bandwidth which limits the amount of broadcast content that can be delivered to television-based client devices. The limited bandwidth of broadcast carousel networks particularly constrains the user-interactive experience, such as for bound applications that are displayed for coordinated interaction with a television program, or for browsing and viewing Web pages through a television-based client device.

A typical broadcast carousel model delivers the broadcast content via a broadcast network that includes an in-band transport and/or an out-of-band transport. An in-band transport is a broadcast communication channel that a television-based client device can be tuned to receive broadcast content. An out-of-band transport is a communication channel that a television-based client device is always tuned to via an alternative source. However, most or all of the available bandwidth in the broadcast network is utilized to deliver the broadcast content to the television-based client devices leaving little or no bandwidth to provide for the bandwidth requirements of interactive television applications. Accordingly, for television-based entertainment and information systems, there is a need for optimized and alternative content delivery solutions.

SUMMARY

Broadcast content delivery systems and methods are described herein.

In an implementation of broadcast content delivery, content is broadcast to television-based client devices via a broadcast communication link. The content can be generated for display to include a user-selectable control to initiate a request for additional content that includes broadcast content and/or on-demand content. A content provider receives the request for the on-demand content from a client device via a two-way communication link, and broadcasts the on-demand content to the television-based client devices via a channel of the broadcast communication link. The content provider also communicates an identifier via the two-way communication link to the client device such that the client device can identify the channel of the broadcast communication link and receive the on-demand content via the broadcast communication link. Broadcast content delivery provides for the efficient delivery of content in a broadcast and/or on-demand network environment, thereby improving the system response time and the user experience.

BRIEF DESCRIPTION OF THE DRAWINGS

The same numbers are used throughout the drawings to reference like features and components.

DETAILED DESCRIPTION

Television-based entertainment systems are increasingly utilized as multi-information systems that a user can interact with to view programs, watch movies, conduct business, shop via e-commerce, communicate via video-phone, browse the Web (e.g., World Wide Web), monitor local events and the weather, network with others, and any number of different tasks that may be of interest to a user of the system. Broadcast content delivery enables content to be delivered as broadcast content or as on-demand content delivered via a broadcast network, thereby improving content delivery response time and the overall user-interactive experience.

Broadcast content, such as a Web page, viewed through a television-based client device is developed such that linked Web pages from the first broadcast Web page are designated for distribution as broadcast content, cached on-demand content, or as on-demand content. The performance and bandwidth utilization of the broadcast content delivery system is enhanced by the optimum use of the broadcast network that communicates the broadcast content, cached on-demand content, and/or the on-demand content from a content provider to the television-based client devices. Broadcast content delivery also extends the broadcast carousel network from being only a content presentation technology to an application development platform because the content is not only delivered on-demand, but can also be dynamically created and then transcoded for delivery on demand.

The following discussion is directed to television-based entertainment and information systems, such as interactive television networks, cable networks, and Web-enabled television networks. Client devices in such systems range from full-resource clients with substantial memory and processing resources, such as television-enabled personal computers and television recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Figure 1:
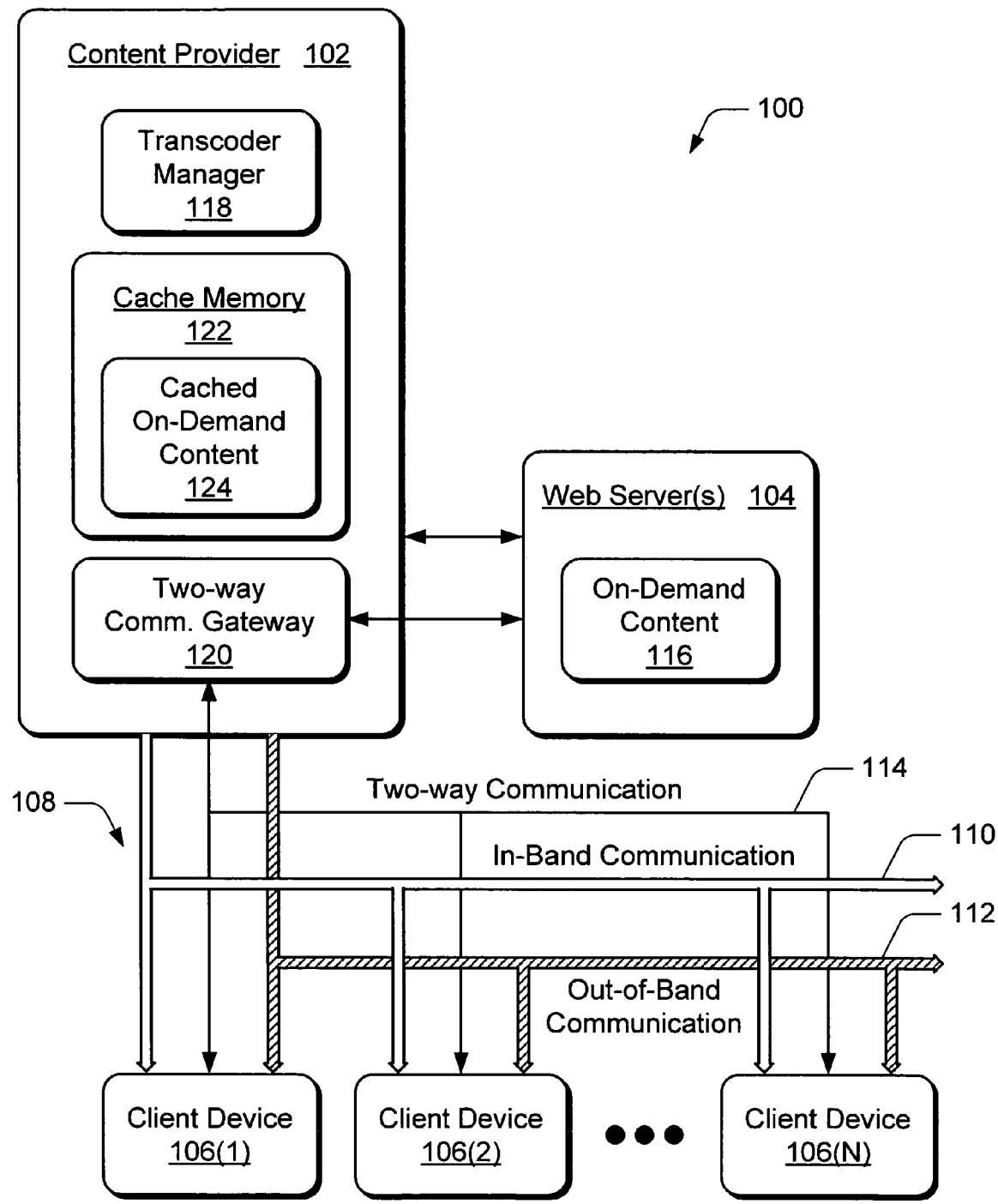
FIG. 1 illustrates various components of an exemplary broadcast content delivery system.

FIG. 1 illustrates various components of an exemplary broadcast content delivery system 100 which includes a content provider 102, one or more Web (e.g., World Wide Web) server(s) 104, and any number of client devices 106(1-N). A client device 106 receives broadcast content, on-demand content, configuration information, electronic program guide data, on-screen display graphic data, and the like from content provider 102 via a broadcast network 108. The broadcast network 108 includes an in-band communication link 110, an out-of-band communication link 112, and a two-way communication link 114. The two-way communication link 114 is also referred to herein as an out-of-band two-way communication link with little bandwidth capacity.

A user can interact with a client device 106 to select a program channel to render a particular program, request a video on-demand movie, respond to a video-phone call, browse program channels, movie listings, the Web, and the like. A user can also interact with the client device 106 to interface with a software application, an e-commerce application, network with others, participate in an on-line game, and any number of other different types of tasks that a user can manage via a client device 106.

In this example, a client device 106 may be implemented with any number and combination of differing components as further described below with reference to the exemplary client device shown in FIG. 5. The client devices 106(1-N) can be implemented in any number of embodiments, such as a set-top box, a digital video recorder (DVR) and playback system, a personal video recorder (PVR) and playback system, an appliance device, and as any other type of client device that may be implemented in a television-based entertainment and information system.

The content provider 102 can be implemented as a content provider in a television-based content distribution system, for example, that provides the broadcast content and data, as well as program guide data, to the multiple client devices 106(1-N). The content provider 102 can be implemented as a satellite operator, a network television operator, a cable operator, and the like to control distribution of stored content, such as movies, television programs, commercials, music, and other audio, video, and/or image content to the client devices 106(1-N). Additionally, content provider 102 controls distribution of live content (e.g., content that was not previously stored, such as live feeds) and/or content stored at other locations (e.g., the Web server(s) 104) to the client devices 106(1-N).

In the example broadcast content delivery system 100, content provider 102 implements a carousel file system to repeatedly broadcast program guide data and on-screen display graphic data over the out-of-band communication link 112, and broadcast content over the in-band communication link 110 to the client devices 106(1-N). Although not shown specifically, broadcast network 108 can include a cable television network, RF, microwave, satellite, and/or data network, such as the Internet, and may also include wired or wireless transmission media using any broadcast format or broadcast protocol. Additionally, broadcast network 108 can be any type of network, using any type of network topology and any network communication protocol, and can be represented or otherwise implemented as a combination of two or more networks.

The Web server(s) 104 maintain on-demand content 116 which can be requested from a client device 106 as on-demand content, such as a Web page, on-screen display data for an interactive television viewing experience, or as any other type of resource. The content provider 102 includes a transcoder manager 118, a two-way communication gateway 120, and a cache memory 122 which caches on-demand content 124 for a faster response to a client device 106 that requests the on-demand content. The transcoder manager 118 formats the on-demand content 116 received from the Web server(s) 104 and the cached on-demand content 124 for communication via a broadcast communication link of the broadcast network 108.

The content provider 102 can broadcast content to the client devices 106(1-N) that includes Web pages for interactive and Web-based browsing. A Web page can include user-selectable controls displayed on the Web page that link to other media content, such as other Web pages. The broadcast content (e.g., Web pages) can be developed such that the linked Web pages are designated for distribution as broadcast content, cached on-demand content, or as on-demand content.

Figure 2:
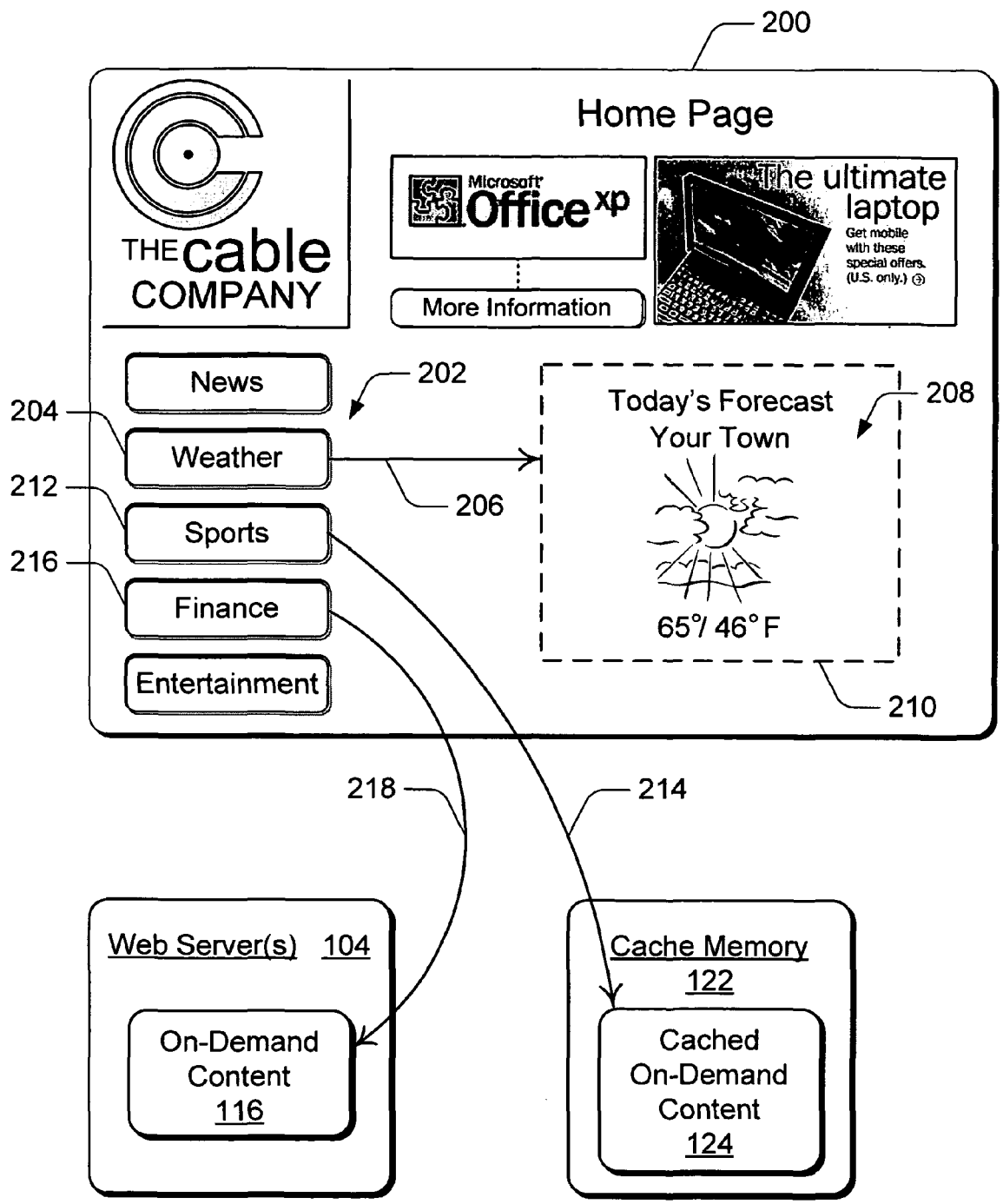
FIG. 2 illustrates an example of broadcast content displayed in the exemplary broadcast content delivery system.

FIG. 2 illustrates an example of content (e.g., Web pages in this example) that is developed to control the distribution as broadcast content, cached on-demand content, or as on-demand content. A first Web page 200 is broadcast content that is broadcast from content provider 102 to the client devices 106(1-N) via the in-band communication link 110 or the out-of-band communication link 112. The broadcast content is generated for display as the first Web page 200 at any number of the client devices 106(1-N).

The Web page 200 includes selectable controls 202 that are displayed as user-selectable links to other content, such as subsequent Web pages. A Web page, or content display, can include any number and combination of selectable controls, such as buttons, switches, menus, check boxes, and the like. Further, any number and combination of text, images, and graphics can be generated for display as an on-screen display over a Web page or other television-based content as a bound application.

When a selectable control 202 is selected by a user with a pointing device, keyboard input, or other user-input device, a request for the associated content is initiated. For example, the "Weather" selectable control 204 initiates a request 206 from a client device 106 for the associated content 208 as broadcast content via the in-band communication link 110 or the out-of-band communication link 112. In this example, the weather content 208 is designated for distribution as broadcast content because it is often requested by users, and can be readily available and displayed when communicated to the requesting client device 106 as broadcast content. The weather content 208 is also an example of an on-screen display graphic 210 displayed over the background of Web page 200.

The "Sports" selectable control 212 initiates a request 214 from a client device 106 for the associated sports content from the cached on-demand content 124 maintained in cache memory 122 at content provider 102. In this example, the sports content is designated as cached on-demand content 124 which is pre-transcoded by the transcoder manager 118 and cached in the cache memory 122 as often requested on-demand content that is also common to one or more users of the client devices 106(1-N). The cached on-demand content 124 can be quickly obtained and broadcast to the requesting client device(s) 106 via the broadcast communication links of the broadcast network 108.

The "Finance" selectable control 216 initiates a request 218 from a client device 106 for the associated finance content which is maintained as on-demand content 116 by Web server(s) 104. The requested finance content may contain user specific or unique client device information, such as a credit card purchase confirmation that includes personal and/or user financial information. This type of content is not distributed as broadcast content for all of the client devices 106(1-N), and is not maintained as cached on-demand content 124 at the content provider 102.

A user can navigate the Web pages by clicking the user-selectable links displayed on Web page 200 and on each of the subsequently displayed Web pages. If a user-selectable link is designated to initiate a request for on-demand content or cached on-demand content, the request is communicated from the client device 106 via the two-way communication link 114 to the content provider 102. If a user-selectable link is designated to initiate a request for additional broadcast content, the client device 106 monitors a broadcast carousel communication link 110 or 112 for the requested content.

The example content requests 206, 214, and 218 are generated as tokenized uniform resource locators (URL) to identify the broadcast content, on-demand content, or cached on-demand content. A tokenized URL request may also include a client identifier to identify the requesting client device 106 to the content provider 102, a cached content indicator to indicate that requested on-demand content is cached at the content provider 102, and/or content variable indicator(s) to indicate a delivery format of the requested on-demand content. For example, a developer of the content can design the on-demand content request to indicate a particular language setting such that the content provider 102 will deliver the requested on-demand content in the designated language. Other content variable indicators can indicate parental control codes and similar client-specific content variables.

When a client device 106 receives a user-selectable input to initiate a request for selectable or additional content that is designated as on-demand content or cached on-demand content, the request is communicated to the content provider 102 via the two-way communication link 114. The content provider 102 receives the request for the on-demand content via the two-way communication gateway 120 and obtains the requested on-demand content. If the request designates that the requested on-demand content is cached at the content provider 102, then the content provider 102 obtains the cached on-demand content 124 maintained in the cache memory 122. Alternatively, the content provider 102 requests the on-demand content 116 from the Web server(s) 104.

When the content provider 102 obtains the requested on-demand content from the cache memory 122 or from the Web server(s) 104, the content provider 102 broadcasts the on-demand content to the client devices 106(1-N) as transient in-band data via a channel of the in-band communication link 110 or via a channel of the out-of-band communication link 112. In an implementation, a channel of a broadcast communication link resolves to a data PID of the broadcast communication link. For example, a client device 106 receives the on-demand content as transient in-band data via the same in-band channel (and is thus implicitly fixed) as the in-band channel over which previous broadcast content was received. A location of a transient in-band response can also be communicated as an absolute reference, such as a transport stream identifier and a data PID that can be ultimately resolved to a frequency to which a client device 106 first tunes and then filters the data PID. A data PID can also transport responses for more than one client device 106, and each client device 106(1-N) can then filter out the respective transient in-band data from the data PID by filtering on data packets that are addressed to a particular client device 106.

The content provider 102 also communicates an identifier (e.g., a data PID identifier, or any other type of identifying mechanism) to the requesting client device 106 via the two-way communication link such that the client device 106 can identify the channel of the broadcast communication link and receive the requested on-demand content. The requested on-demand content that is broadcast via the broadcast communication link to all of the client devices 106(1-N) can only be received by the designated client device 106 that is addressed to receive the identifier via the two-way communication link 114.

The addressing information is also communicated to the requesting client device 106 within the requested on-demand content via the broadcast communication link, and the identifying mechanism is communicated to the requesting client device 106 via the two-way communication link such that the client device 106 can locate the information in the broadcast communication stream and receive the data packets that are addressed to it. The client device 106 filters for the on-demand content response that is addressed to it on the specified channel of the broadcast communication link.

The broadcast content delivery system 100 provides for an adaptive and efficient use of the bandwidth available for each of the in-band communication link 110, the out-of-band communication link 112, and the two-way communication link 114. A developer can control distribution of the content by designating the content for distribution as either broadcast content, on-demand content, cached on-demand content, and/or as any combination thereof which allows for an efficient use of the available bandwidth. Additionally, the on-demand content requests can be tracked and tabulated such that often requested content can then be distributed as broadcast content. For example, if cached on-demand content is requested often, the requested content can be removed from cache memory 122 and then distributed as broadcast content to the client devices 106(1-N) via the broadcast communication network 108. The performance of the entire broadcast content delivery system 100 is enhanced by the intelligent selection of which pages of content (e.g., in a Web-based example) are designated to be on-demand, cached on-demand, and/or which pages are designated to be broadcast.

If the bandwidth use of the two-way communication link 114 is reduced below an implementation-specified limit, the content provider 102 can communicate the requested on-demand content to the designated client device 106 via the two-way communication link 114 to quickly deliver the requested content for a more responsive user experience. The content provider 102 can also specify, or designate, the frequency and duration that requested on-demand content will remain as a response on a channel of a broadcast communication link. This provides further optimization of bandwidth use and request responsiveness from the client devices 106 (1-N).

Methods for broadcast content delivery, such as exemplary methods 300 and 400 described with reference to FIGS. 3 and 4 respectively, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
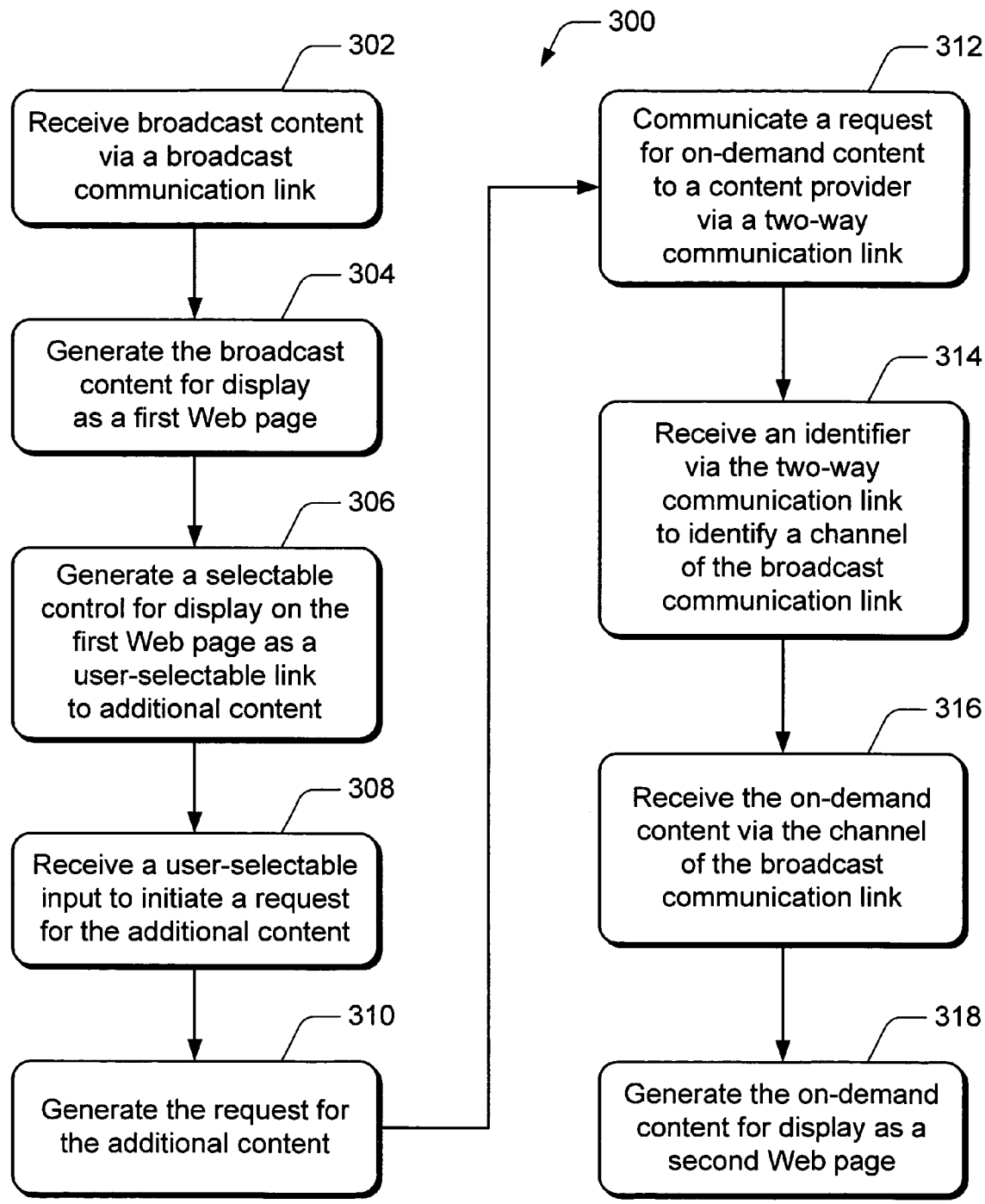
FIG. 3 is a flow diagram that illustrates an exemplary method for broadcast content delivery and is described with reference to a client device in the exemplary broadcast content delivery system shown in FIG. 1.

FIG. 3 illustrates an exemplary method 300 for broadcast content delivery and is described with reference to a client device, such as a client device 106 in the exemplary broadcast content delivery system 100 shown in FIG. 1. The order in which the method is described is not intended to be construed as a limitation, and any number of the described method blocks can be combined in any order to implement the method. Furthermore, the method can be implemented in any suitable hardware, software, firmware, or combination thereof.

At block 302, broadcast content is received (at a client device) via a broadcast communication link. For example, client devices 106(1-N) (FIG. 1) receive broadcast content from content provider 102 via the in-band communication link 110 and/or the out-of-band communication link 112. At block 304, the broadcast content is generated for display as a first Web page, and at block 306, a selectable control is generated for display on the first Web page as a user-selectable link to initiate a request for additional or selectable content. For example, a client device 106 generates the Web page 200 (FIG. 2) to include selectable controls 202 that are user-selectable links to initiate a request for additional broadcast and/or on-demand content, such as subsequent Web pages, other content, or other resources.

At block 308, a user-selectable input to initiate a request for the additional content is received (at a client device). At block 310, the request for the additional content is generated. The request can include any one or more of a tokenized uniform resource locator to identify the requested additional content as on-demand content, a client device identifier, a cached content indicator to indicate that the on-demand content is cached at a content provider, and/or content variable indicator(s) to indicate a delivery format of the on-demand content.

At block 312, the request for on-demand content is communicated to a content provider via a two-way communication link. For example, the client device 106 communicates the request for the on-demand content to the content provider 102 via the two-way communication link 114. At block 314, an identifier is received via the two-way communication link to identify a channel of the broadcast communication link. For example, the client device 106 receives an identifier from the content provider 102 via the two-way communication link 114. The identifier identifies a channel of the in-band communication link 110 or the out-of-band communication link 112 over which the content provider 102 communicates the requested on-demand content to the client device 106.

At block 316, the on-demand content is received via the channel of the broadcast communication link. The requested on-demand content that is broadcast via the broadcast communication link to all of the client devices 106(1-N) from the content provider 102 can only be received by the designated client device 106 that is addressed to receive the identifier via the two-way communication link 114. At block 318, the on-demand content is generated for display as a second Web page. For example, the weather content 208 is generated for display as an on-screen display graphic 210 over the background of Web page 200.

Figure 4:
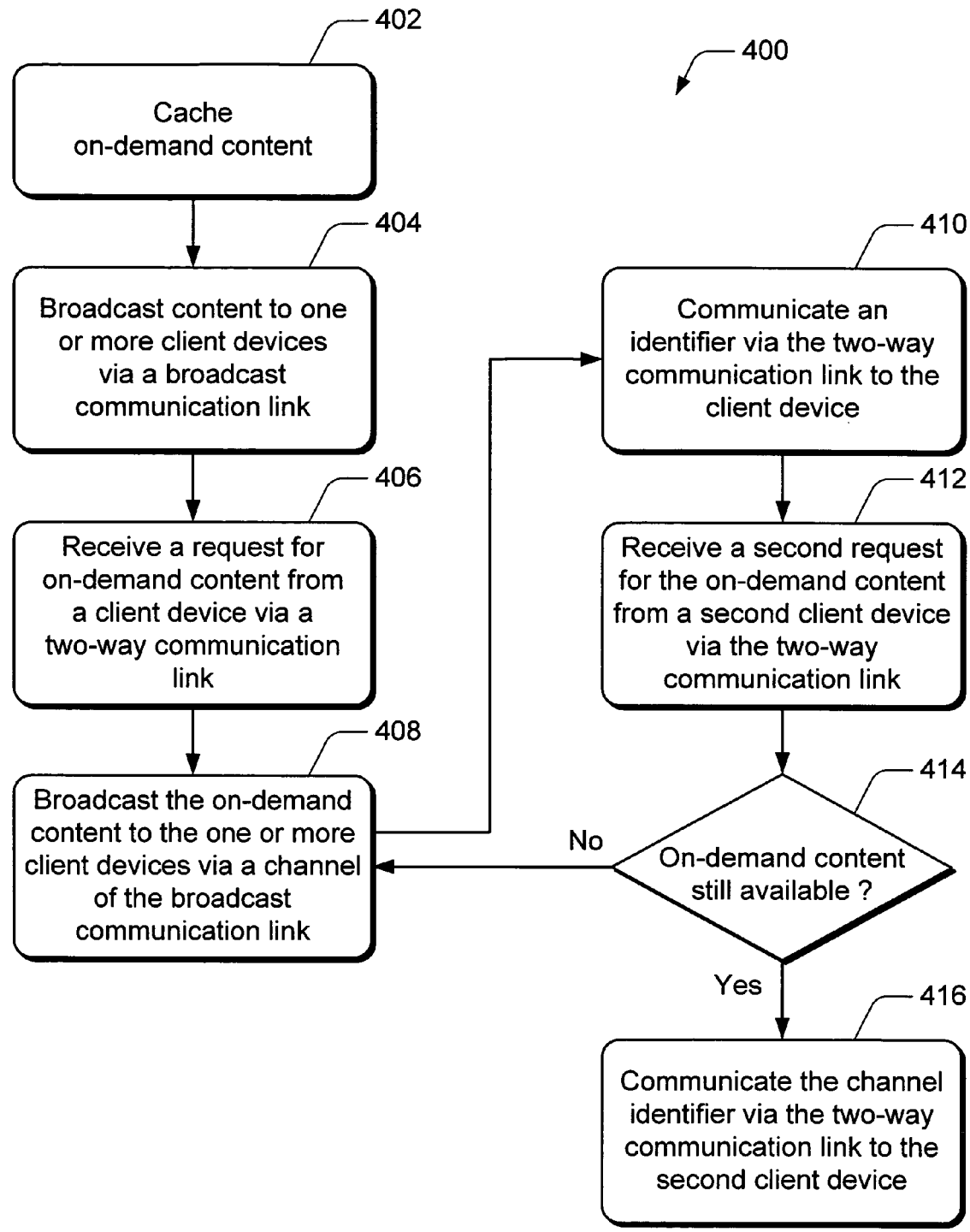
FIG. 4 is a flow diagram that illustrates an exemplary method for broadcast content delivery and is described with reference to a content provider in the exemplary broadcast content delivery system shown in FIG. 1.

FIG. 4 illustrates an exemplary method 400 for broadcast content delivery and is described with reference to a content provider, such as content provider 102 in the exemplary broadcast content delivery system 100 shown in FIG. 1. The order in which the method is described is not intended to be construed as a limitation, and any number of the described method blocks can be combined in any order to implement the method. Furthermore, the method can be implemented in any suitable hardware, software, firmware, or combination thereof.

At block 402, on-demand content is cached (at a content provider). For example, content provider 102 caches on-demand content 124 with cache memory 122. At block 404, content is broadcast to one or more client devices via a broadcast communication link. For example, content provider 102 broadcasts content to the client devices 106(1-N) via the in-band communication link 110 and/or the out-of-band communication link 112. The broadcast content can include a displayable selectable control to initiate a request for additional or selectable content. For example, Web page 200 includes selectable controls 202 that are user-selectable links to initiate a request for additional broadcast content or on-demand content, such as subsequent Web pages, other content, or other resources.

At block 406, a request for the on-demand content is received from a client device via a two-way communication link. For example, content provider 102 receives a request for on-demand content 116 or cached on-demand content 124 from a client device 106 via the two-way communication link 114. The request can be received as a tokenized uniform resource locator to identify the on-demand content, and can include a client identifier to identify the client device, a cached content indicator to indicate that the on-demand content is cached at the content provider, and/or content variable indicator(s) to indicate a delivery format of the on-demand content.

At block 408, the on-demand content is broadcast to the one or more client devices via a channel of the broadcast communication link. For example, the content provider 102 broadcasts the requested on-demand content or cached on-demand content as transient in-band data via a channel of the in-band communication link 110 or the out-of-band communication link 112. At block 410, an identifier is communicated via the two-way communication link to the client device such that the client device can identify the channel of the broadcast communication link and receive the on-demand content. The content provider 102 addresses the identifier to the designated client device 106 such that only the designated client device 106 can receive the on-demand content broadcast via the broadcast communication link.

At block 412, a second request for the on-demand content is received from a second client device via the two-way communication link. At block 414, a determination is made as to whether the on-demand content is still available (e.g., still being broadcast) via the broadcast communication link. If the on-demand content is still available (i.e., "yes" from block 414), then the identifier is communicated via the two-way communication link to the second client device such that the second client device can identify the channel of the broadcast communication link and receive the on-demand content at block 416. The duration, or lifetime, over which transient on-demand content that is already available on the transport via the broadcast communication link can be increased to serve additional requests for the on-demand content and to provide that popular requests are responded to faster. If the on-demand content is not still available (i.e., "no" from block 414), then the method continues at blocks 408-410 as described above.

Figure 5:
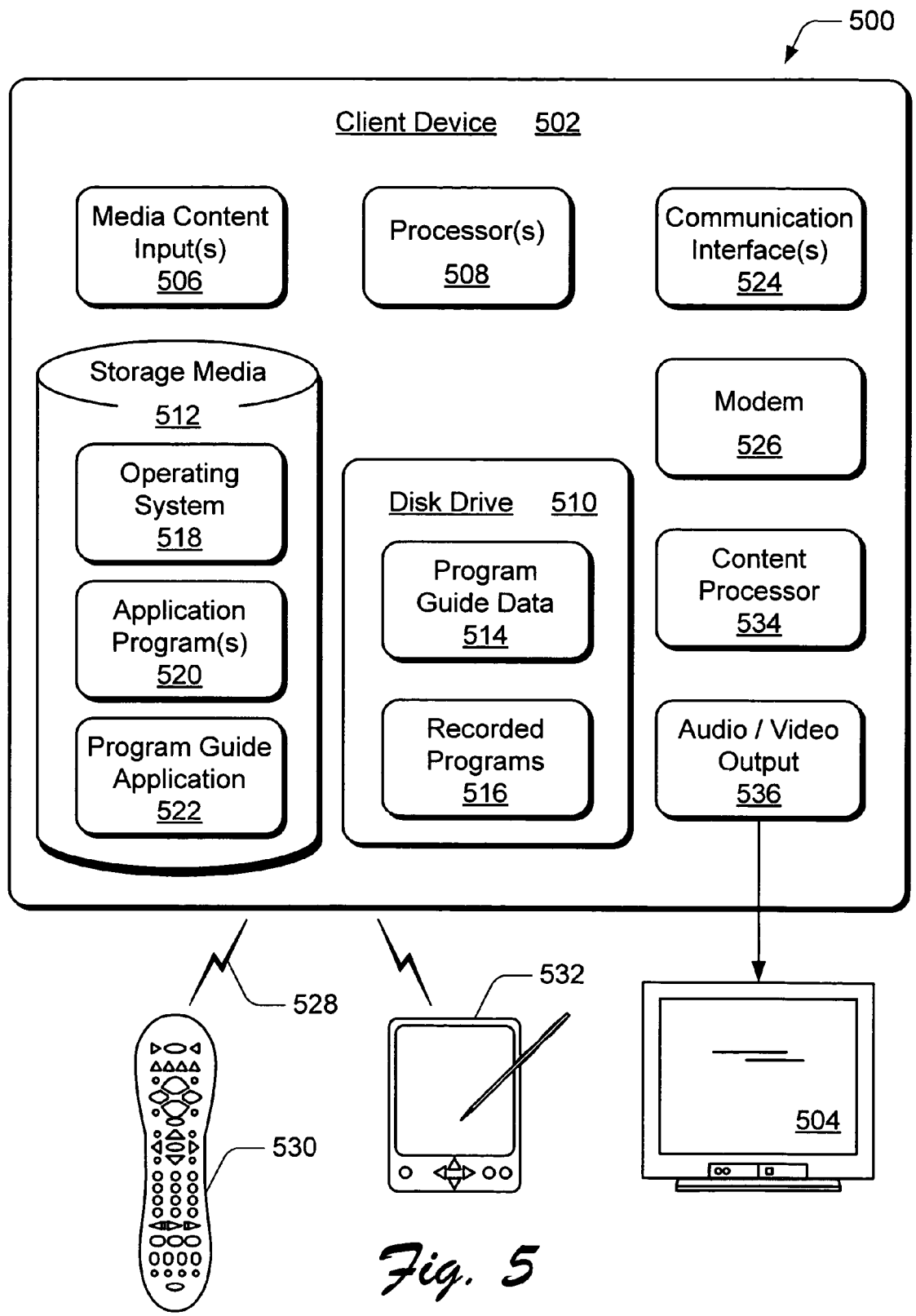
FIG. 5 illustrates various components of an exemplary client device implemented in a broadcast content delivery system.

FIG. 5 illustrates a television-based system 500 that includes an exemplary client device 502 and a display device 504 on which the broadcast content, on-demand content, and on-screen display graphic data are rendered for display. Client device 502 can be implemented as a computing device in any number of embodiments with numerous other general purpose or special purpose computing system environments or configurations. Examples of well known computing systems, environments, and/or configurations that may be implemented in the television-based system 500 include, but are not limited to, personal computers, server computers, Web browsers, hand-held or laptop devices, multiprocessor systems, microprocessor-based systems, set-top boxes, programmable consumer electronics, network PCs, minicomputers, mainframe computers, a digital video recorder (DVR) and playback system, gaming consoles, distributed computing environments that include any of the above systems or devices, and the like.

Client device 502 includes one or more media content inputs 506 which may include Internet Protocol (IP) inputs over which streams of media content are received via an IP-based network. The media content inputs 506 may also include tuners that can be tuned to various frequencies or channels to receive television signals when client device 502 is embodied as a set-top box or as a digital video recorder, for example. Client device 502 also includes one or more processors 508 (e.g., any of microprocessors, controllers, and the like) which process various instructions to control the operation of client device 502 and to communicate with other electronic and computing devices.

Client device 502 can be implemented with a disk drive 510 and a storage media 512, examples of which include a random access memory (RAM) and a non-volatile memory (e.g., any one or more of a read-only memory (ROM), flash memory, EPROM, EEPROM, etc.). Disk drive 510 can include any type of magnetic or optical storage device, such as a hard disk drive, a recordable and/or rewriteable compact disc (CD), a DVD, a DVD+RW, and the like. The disk drive 510 provides a data storage mechanism to store various information and/or data such as received media content, program guide data 514, and recorded programs 516.

An operating system 518, application program(s) 520, and a program guide application 522 can be maintained with storage media 512 and executed on processor(s) 508. The program guide application 522 is implemented to process the program guide data 514 and generate program guides for display which enable a viewer to navigate through an onscreen display and locate broadcast programs, recorded programs, video on-demand programs and movies, interactive game selections, and other media access information or content of interest to the viewer.

Application programs 520 can include a browser application and an email application. A browser application provides a user interface through which a user can interact with and browse the Web. An email application facilitates email communication and provides a user interface through which a user can interact with a mail service provider.

Client device 502 further includes communication interface(s) 524 and a modem 526. The communication interface(s) 524 can be implemented as any one or more of a serial and/or parallel interface, a wireless interface, any type of network interface, and as any other type of communication interface. A wireless interface enables client device 502 to receive control input commands 528 and other information from an input device, such as from remote control device 530 or from another infrared (IR), 802.11, Bluetooth, or similar RF input device. Input devices can include a wireless keyboard or another handheld input device 532 such as a personal digital assistant (PDA), handheld computer, wireless phone, and/or other mechanisms to interact with, and to input information to client device 502. Modem 526 facilitates client device 502 communication with other electronic and computing devices via a conventional telephone line, a DSL connection, cable, and/or other type of connection.

Client device 502 also includes a content processor 534 which can include a video decoder and/or additional processors to receive, process, and decode media content and display data. Client device 502 also includes an audio and/or video output 536 that provides audio and video to an audio rendering and/or display device 504, or to other devices that process, display, and/or otherwise render audio, video, and display data. Video signals and audio signals can be communicated from client device 502 to television 504 via an RF (radio frequency) link, S-video link, composite video link, component video link, analog audio connection, or other similar communication links.

Although shown separately, some of the components of client device 502 may be implemented in an application specific integrated circuit (ASIC). Additionally, a system bus (not shown) typically connects the various components within client device 502. A system bus can be implemented as one or more of any of several types of bus structures, including a memory bus or memory controller, a peripheral bus, an accelerated graphics port, or a local bus using any of a variety of bus architectures.

Although embodiments of broadcast content delivery have been described in language specific to structural features and/or methods, it is to be understood that the subject of the appended claims is not necessarily limited to the specific features or methods described. Rather, the specific features and methods are disclosed as exemplary implementations of broadcast content delivery systems and methods.

The invention claimed is:

1. A broadcast content delivery system, comprising:
a content provider configured to broadcast content to a plurality of client devices, comprising a first client device and a second client device, the broadcast content including a first Web page received by the content provider from a Web server in communication with the content provider, wherein the first Web page is broadcast by the content provider to the plurality client devices as broadcast content viewable for display at the client devices, the Web page having a selectable control to initiate requests from the client devices to the content provider for a selectable content which includes at least one of broadcast content and on-demand content;
a broadcast communication link configured to communicate the broadcast content and the on-demand content from the content provider to the plurality of client devices;
an out-of-band two-way communication link configured to communicate the requests for the on-demand content from the client devices to the content provider;
the content provider further configured to:
  receive the on-demand content from the Web server;
  broadcast the on-demand content received from the Web server to the one or more client devices as transient in-band data over a particular channel of the broadcast communication link in response to a first request for the on-demand content received from the first client through initiation of the selectable control on the first Web page displayed at the first client;
  communicate a first identifier to the first client device over the two way communication link such that the first client device can identify the particular channel of the broadcast communication link and receive the on-demand content;
  receive a second request for the on-demand content from the second client device through initiation of the selectable control on the first Web page displayed at the second client device;
  determine that the on-demand content requested by the second client device is currently being broadcasted to the first client device as the transient in-band data on the particular channel of the broadcast communication link; and
  communicate a second identifier to the second client device over the two way communication link such that the second client device identifies the particular channel of the broadcast communication link and receives the on-demand content already being broadcasted on the particular channel in response to the first request, wherein the first client device and the second client device receive the on-demand content for generating a second Web page, wherein:
    the selectable content is cached on-demand content received from the Web server and stored in a cache memory at the content provider in anticipation of the requests for the cached on-demand content from the client devices;

the content provider is further configured to broadcast the cached on-demand content to the client devices as the transient in-band data; and when the cached on-demand content is requested a certain number of times, the cached on-demand content is removed from the cache memory at the content provider and distributed by the content provider as broadcast content to the client devices, rather than as on-demand content.

2. A broadcast content delivery system as recited in claim 1, wherein the client devices are further configured to:

generate the broadcast content for display as the first Web page;

generate the selectable control for display on the first Web page as a user selectable link to the selectable content; and generate the selectable content for display as the second Web page.

3. A broadcast content delivery system as recited in claim 1, wherein the client devices receive the on-demand content as the transient in-band data over a same in-band channel as an in-band channel over which the broadcast content including the first Web page was broadcast.

4. A broadcast content delivery system as recited in claim 3, wherein the first and second client devices receive the on-demand content by filtering out respective transient in-band data from the in-band channel by filtering data packets that are addressed to each respective client device based on the respective identifier received from the content provider.

5. A broadcast content delivery system as recited in claim 1, wherein the client devices are further configured to generate the requests for the on-demand content to include:

a tokenized uniform resource locator to identify the on-demand content; and a client identifier to identify the client device to the content provider.

6. A broadcast content delivery system as recited in claim 1, wherein the client devices are further configured to generate the requests for the on-demand content to include:

a tokenized uniform resource locator to identify the on-demand content;

a client identifier to identify the client device to the content provider; and a cached content indicator to indicate that the on-demand content is cached at the content provider.

7. A broadcast content delivery system as recited in claim 1, wherein the client devices are further configured to generate the requests for the on-demand content to include:

a tokenized uniform resource locator to identify the on-demand content;

a client identifier to identify the client device to the content provider; and a content variable indicator to indicate a delivery format of the on-demand content.

8. A broadcast content delivery system as recited in claim 1, wherein the on-demand content that is broadcast over the broadcast communication link can only be received by client devices that receive a respective identifier.

9. A broadcast content delivery system as recited in claim 1, wherein the content provider is further configured to:

receive the requests for the on-demand content from the client devices; and request the on-demand content from the Web server in response to receiving the first request.

10. A broadcast content delivery system as recited in claim 1, wherein the content provider is further configured to:

receive the first request for the on-demand content from the first client device;

request a resource from the Web server in response to receiving the first request;

broadcast the resource as the on-demand content to the first client device; and provide access to the broadcast of the on-demand content to the second client device upon receiving the second request by sending the second identifier to the second client device.

11. A broadcast content delivery system as recited in claim 1, wherein the content provider is further configured to:

receive the first request for the on-demand content from the first client device;

request the second Web page from the Web server in response to receiving the first request;

cache the second Web page at the content provider;

broadcast the second Web page as the on-demand content to the first client device; and provide access to the broadcast of the on-demand content to the second client device upon receiving the second request by sending the second identifier to the second client device.

12. A content provider, comprising:

a broadcast system configured to:

distribute broadcast content to a plurality of client devices over a broadcast communication link, the broadcast content including a Web page having a selectable control for display at the plurality of client devices to initiate requests for selectable content, the selectable content comprising on-demand content obtained from a Web server, wherein a portion of the on-demand content is stored in a cache memory at the content provider as cached on-demand content in anticipation of the requests for the selectable content from the client devices; and distribute the selectable content as on-demand content separate from the broadcast content to one or more of the client devices on a channel of the broadcast communication link when the on-demand content is requested as the selectable content; and a two-way communication system configured to receive at least one request for the on-demand content from at least one client device of the plurality of client devices through a two-way communication link separate from the broadcast communication link, wherein when the cached on-demand content is requested a specified number of times, the cached on-demand content is removed from the cache memory at the content provider and distributed by the content provider as part of the broadcast content to the plurality of client devices, rather than as separate on-demand content.

13. A content provider as recited in claim 12, wherein the selectable content includes additional broadcast content that is displayed overlaid on the Web page displayed by a particular client device in response to selection of the selectable control at the particular client device.

14. A content provider as recited in claim 12, wherein the broadcast system is further configured to distribute the cached on-demand content to the at least one client device as transient in-band data.

15. A content provider as recited in claim 12, wherein:
the broadcast communication link is an in-band communication link, and wherein the in-band communication link is configured to distribute the on-demand content as transient in-band data, and
the at least one client device receives the on-demand content by filtering out respective transient in-band data from the in-band channel by filtering data packets that are addressed to each respective client device based on the respective identifier received from the content provider.

16. A content provider as recited in claim 12, wherein the two-way communication system is further configured to receive the at least one request as a tokenized uniform resource locator to identify the on-demand content, and wherein the at least one request includes a client identifier to identify the at least one client device to the content provider.

17. A content provider as recited in claim 12, wherein the two-way communication system is further configured to receive the at least one request as a tokenized uniform resource locator to identify the on-demand content, and wherein the at least one request includes a client identifier to identify the at least one client device to the content provider and includes a cached content indicator to indicate that the on-demand content is cached at the content provider.

18. A content provider as recited in claim 12, wherein the two-way communication system is further configured to receive the at least one request as a tokenized uniform resource locator to identify the on-demand content, and wherein the at least one request includes a client identifier to identify the at least one client device to the content provider and includes a content variable indicator to indicate a delivery format of the on-demand content.

19. A content provider as recited in claim 12, wherein the selectable content distributed as the on-demand content over the broadcast communication link can only be received by the at least one client device that receives the identifier.

20. A method implemented on a computing device having instructions executable by a processor and stored on a computer readable storage media, the method comprising:
broadcasting broadcast content from a content provider to a plurality of client devices over a broadcast communication link, the broadcast content including a Web page having a displayable selectable control to initiate requests for additional content that includes additional broadcast content and on-demand content, wherein the on-demand content includes cached on-demand content obtained from a Web server in advance and maintained in a cache memory at the content provider;
receiving a particular request for the on-demand content from a particular client device over a two-way communication link;
broadcasting the on-demand content separately from the broadcast content to the particular client device over a channel of the broadcast communication link; and
communicating an identifier over the two-way communication link to the particular client device such that the particular client device can identify the channel of the broadcast communication link and receive the on-demand content, wherein when the cached on-demand content is requested a predetermined number of times, the cached on-demand content is removed from the cache memory at the content provided and distributed by the content provider as part of the broadcast content to the plurality of client devices, rather than on-demand in response to requests from individual client devices.

21. A method as recited in claim 20, wherein the additional content includes additional broadcast content that is displayed over the Web page displayed by the particular client device in response to selection of the selectable control at the particular client device.

22. A method as recited in claim 20, wherein:
receiving the particular request from the particular client device includes receiving the particular request as a tokenized uniform resource locator to identify the on-demand content, and
the particular request includes a client identifier to identify the particular client device.

23. A method as recited in claim 20, further comprising caching the on-demand content, wherein:
receiving the particular request includes receiving the particular request as a tokenized uniform resource locator to identify the on-demand content; and
the particular request includes a client identifier to identify the particular client device and includes a cached content indicator to indicate that the on-demand content is cached.

24. A method as recited in claim 20, wherein receiving the particular request includes receiving the particular request as a tokenized uniform resource locator to identify the on-demand content, and wherein the particular request includes a client identifier to identify the particular client device and includes a content variable indicator to indicate a delivery format of the on-demand content.

25. A method as recited in claim 20, wherein:
the broadcast communication link is an in-band communication link, and wherein the in-band communication link is configured to broadcast the on-demand content as transient in-band data; and
the particular client device receives the on-demand content by filtering out respective transient in-band data from the in-band channel by filtering data packets that are addressed to the particular client device based on the identifier received from the content provider.

26. A method implemented on a computing device having instructions executable by a processor and stored on a computer readable storage media, the method comprising:
receiving a broadcast content for display which includes a first Web page having a selectable control to initiate a request for additional content, the broadcast content being received by the computing device through a broadcast communication link;
receiving a user-selectable input to initiate the request for the additional content, wherein the request generates a tokenized uniform resource locator comprising a content variable indicator to indicate a delivery format of the additional content;
communicating the request for the additional content to a content provider through a two-way communication link when the request is for on-demand content;
receiving an identifier over the two-way communication link to identify a channel of the broadcast communication link and to receive the on-demand content over the broadcast communication link as a separate stream from the broadcast content, wherein at least a portion of the on-demand content is obtained by the content provider in advance and maintained in a cache memory at the content provider as cached on-demand content; and
when the cached on-demand content has been requested a certain number of times by the computing device or one or more other computing devices, the cached on-demand content is removed from the cache memory at the content provider and received from the content provider as part of the broadcast content, rather than the separate stream.

27. A method as recited in claim 26, wherein:
receiving the user selectable input includes the request being initiated for additional broadcast content; and
the additional broadcast content is displayed overlaid on the first Web page displayed by the client device in response to selection of the selectable control at client device.

28. A method as recited in claim 26, wherein receiving the user selectable input includes the request being initiated for the on-demand content stored on a Web server in communication with the content provider.

29. A method as recited in claim 26, wherein receiving the user selectable input includes the request being initiated for the cached on-demand content stored in the cache memory at the content provider.

30. A method as recited in claim 26, further comprising:
generating the broadcast content for display as the first Web page;
generating the selectable control for display on the first Web page as a user selectable link to the on-demand content, the first Web page further including another selectable control as a selectable link to have broadcast content displayed overlaid on the first Web page; and
generating the on-demand content for display as the second Web page.

31. A method as recited in claim 26, further comprising generating the request for the on-demand content to include the tokenized uniform resource locator to identify the on-demand content, and to include a client device identifier.

32. A method as recited in claim 26, further comprising generating the request for the on-demand content to include:
the tokenized uniform resource locator to identify the on-demand content;
a client device identifier; and
a cached content indicator to indicate that the on-demand content is cached at the content provider.

33. A method as recited in claim 26, further comprising generating the request for the on-demand content to include:
the tokenized uniform resource locator to identify the on-demand content;
a client device identifier; and
the content variable indicator to indicate a delivery format of the on-demand content.

34. A method Comprising:
broadcasting content from a content provider to one or more client devices over a broadcast communication link, the content including a Web page having a displayable selectable control to initiate a request for additional content;
broadcasting the additional content to the one or more client devices over a channel of the broadcast communication link when the additional content is requested as on-demand content by a first request received from a first client device;
communicating an identifier over a two-way communication link to the first client device that requests the on-demand content such that the first client device can identify the channel of the broadcast communication link and receive the on-demand content;
communicating the identifier over the two-way communication link to a second client device in response to a second request for the on-demand content received from the second client device, such that the second client device can identify the channel of the broadcast communication link over which the on-demand content is being broadcasted in response to the first request and receive the on-demand content, wherein the first and second client devices receive the on-demand content by filtering out respective transient in-band data from the in-band channel by filtering data packets that are addressed to each respective client device based on the respective identifier received from the content provider; and
when the request for the additional content is a request for cached on-demand content that is cached in a cache memory at the content provider, and the cached on-demand content is requested a certain number of times, removing the cached on-demand content from the cache memory at the content provider and distributing the cached on-demand content by the content provider as broadcast content to the one or more client devices, rather than as on-demand content.

35. The method as recited in claim 34, further comprising directing the content provider to receive the request for the additional content as a request for additional broadcast content to be displayed overlaid on the Web page displayed by a particular client device in response to selection of the selectable control at the particular client device.

36. The method as recited in claim 34, further comprising directing the content provider to receive the first request for the additional content as a request for the on-demand content, wherein the content provider obtains the on-demand content from a Web server in response to the first request and provides the on-demand content already obtained from the Web server in response to the second request.

37. The method as recited in claim 34, further comprising directing the content provider to receive the on-demand content from a Web server and store the on-demand content in a cache memory at the content provider in anticipation of the requests for the cached on-demand content from the client devices, wherein the cached on-demand content is broadcast to the client devices as transient in-band data.

38. The method as recited in claim 34, further comprising directing the content provider to address the identifier to the first and second client devices such that only the first and second client devices can receive the on-demand content broadcast via the broadcast communication link.

39. A television-based client device comprising:
a processor coupled to storage media, the processor configured by executable instructions to perform operations to:
receive broadcast content for display which includes a first Web page having a selectable control to initiate a request for additional content, the broadcast content being received over a broadcast communication link;
communicate a user-selectable input as the request for the additional content to a content provider over a two-way communication link when the request is for on-demand content, wherein the request for on-demand content generates a tokenized uniform resource locator comprising a content variable indicator to indicate a delivery format of the additional content separate from the broadcast content, wherein at least a portion of the on-demand content is obtained by the content provider in advance and maintained in a cache memory at the content provider as cached on-demand content; and
when the cached on-demand content has been requested a certain number of times by the television-based client device or one or more other client devices, the cached on-demand content is removed from the cache memory at the content provider and received as part of the broadcast content, rather than separate from the broadcast content.

40. The television-based client device as recited in claim 39, further comprising performing operations to:
generate the broadcast content for display as the first Web page;
generate the selectable control for display on the first Web page as a user selectable link to the on-demand content, the first Web page further including another selectable control as a selectable link to have broadcast content displayed overlaid on the first Web page; and
generate the on-demand content for display as the second Web page.

41. The television-based client device as recited in claim 39, further comprising performing operations to generate the request for the on-demand content to include the tokenized uniform resource locator to identify the on-demand content, and to include a client identifier to identify the television-based client device to the content provider.

42. The television-based client device as recited in claim 39, further comprising performing operations to generate the request for the on-demand content to include:
the tokenized uniform resource locator to identify the on-demand content;
a client identifier to identify the television-based client device to the content provider; and
a cached content indicator to indicate that the on-demand content is cached at the content provider.

43. The television-based client device as recited in claim 39, further comprising performing operations to generate the request for the on-demand content to include:
the tokenized uniform resource locator to identify the on-demand content;
a client identifier to identify the television-based client device to the content provider; and
the content variable indicator to indicate a delivery format of the on-demand content.

* * * * *